US008798862B2

(12) United States Patent
Oniwa et al.

(10) Patent No.: US 8,798,862 B2
(45) Date of Patent: Aug. 5, 2014

(54) ELECTRIC POWER STEERING DEVICE

(75) Inventors: Yoshihiro Oniwa, Utsunomiya (JP);
Yasuo Shimizu, Shimotsuke (JP);
Shigeru Yamawaki, Tochigi-ken (JP);
Kazushige Sugamata, Utsunomiya (JP);
Atsuhiko Yoneda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 131 days.

(21) Appl. No.: 13/510,874

(22) PCT Filed: Nov. 16, 2010

(86) PCT No.: PCT/JP2010/070322
§ 371 (c)(1),
(2), (4) Date: May 18, 2012

(87) PCT Pub. No.: WO2011/062145
PCT Pub. Date: May 26, 2011

(65) Prior Publication Data
US 2012/0232759 A1 Sep. 13, 2012

(30) Foreign Application Priority Data

Nov. 20, 2009 (JP) ................................. 2009-265403

(51) Int. Cl.
*B62D 6/08* (2006.01)
(52) U.S. Cl.
USPC .............................. 701/41; 180/6.2; 180/6.28
(58) Field of Classification Search
USPC ............ 701/41–44; 180/6.2, 6.24, 6.28, 6.48, 180/6.5
See application file for complete search history.

(56) References Cited

U.S. PATENT DOCUMENTS

| 6,876,910 | B2 | 4/2005 | Kifuku | |
|---|---|---|---|---|
| 7,546,896 | B2 * | 6/2009 | Furusho et al. | 180/446 |
| 7,900,742 | B2 * | 3/2011 | Kubokawa et al. | 180/402 |
| 2002/0026267 | A1 | 2/2002 | Kifuku | |

FOREIGN PATENT DOCUMENTS

| JP | 54-110527 | A | 8/1979 |
|---|---|---|---|
| JP | 60-174364 | A | 9/1985 |
| JP | 2000-103349 | A | 4/2000 |
| JP | 2000-313348 | A | 11/2000 |
| JP | 2006-290206 | A | 10/2006 |
| JP | 3840310 | B2 | 11/2006 |

* cited by examiner

*Primary Examiner* — Yonel Beaulieu
(74) *Attorney, Agent, or Firm* — Arent Fox LLP

(57) ABSTRACT

An electric power steering device wherein mechanical friction is electrically provided. A steering torque value is detected by a steering torque sensor according to the operation of a steering wheel. An assist current value is calculated by an assist control section on the basis of the steering torque value. A target current value based on the assist current value is determined. For providing friction to the operation of the steering wheel, a friction control section and a friction torque value/current value conversion section generate a corrected steering torque value. A second corrected target current value is created by correcting a first corrected target current value by a friction current value. The corrected steering torque value is obtained by correcting the steering torque value by a friction torque value. The target current value is generated, resulting in a motor being subjected to driving control.

3 Claims, 6 Drawing Sheets

ELECTRIC POWER STEERING DEVICE

CROSS-REFERENCED TO RELATED APPLICATION

This application is a National Stage entry of International Application PCT/JP2010/070322, filed Nov. 16, 2010, which claims priority to Japanese Patent Application No. 2009-265403, filed Nov. 20, 2009, each of the disclosures of the prior applications being hereby incorporated in their entirety by reference.

TECHNICAL FIELD

The present invention relates to an electric power steering apparatus (device) for transmitting the power of an actuator such as a motor (an electric motor) or the like as a steering assisting force to the steering system of a vehicle when the driver of the vehicle steers the vehicle with a steering wheel, for thereby reducing the burden on the driver to operate the steering wheel.

BACKGROUND ART

There are known in the art power steering apparatus for generating a steering assisting force to allow the driver of a vehicle to steer the vehicle with a reduced steering force.

Japanese Laid-Open Patent Publication No. 54-110527 discloses a hydraulic power steering apparatus including a preloading device for use on a vehicle. The preloading device generates a hydraulic pressure against a spring force which presses a rack guide at all times and reduces a pressing force applied to a pinion, i.e., a steering shaft, to lower the hydraulic pressure when a steering wheel is turned, so that the rotational resistive force applied to the steering wheel when the steering wheel is turned is smaller than the rotational resistive force applied to the steering wheel when the steering wheel is at rest.

Japanese Laid-Open Patent Publication No. 60-174364 discloses a hydraulic power steering apparatus including a hydraulic pressing mechanism for use on a vehicle. The hydraulic pressing mechanism applies a hydraulic pressure to a rack guide depending on the speed of the vehicle only in a neutral region of the steering wheel, thereby preventing the steering wheel from wobbling at the time the vehicle travels at high speeds. The hydraulic pressing mechanism also applies a frictional resistive force depending on the speed of the vehicle to a rack shaft to reduce vibrations that are transmitted from road wheels to the steering wheel. When the steering wheel is turned out of the neutral region, the hydraulic pressing mechanism stops applying the frictional resistive force to the rack guide to allow the driver to turn the steering wheel with reduced manual forces.

Japanese Laid-Open Patent Publication No. 2000-313348 discloses a hydraulic power steering apparatus for use on a vehicle. The disclosed hydraulic power steering apparatus includes a rack guide for pressing a rack toward a pinion under a hydraulic pressure, a spring for applying a constant pressing force to the rack guide at all times, and a preloading device for increasing the pressing force applied by the rack guide depending on an increase in the hydraulic pressure. When the steering wheel of the vehicle is turned, the hydraulic pressure is lowered to reduce the pressing force applied by the rack guide to allow the driver of the vehicle to turn the steering wheel with reduced manual forces. When the steering wheel is in its neutral position, the hydraulic pressure is increased to increase the pressing force applied by the rack guide for higher steering stability.

Generally, if a frictional resistive force (hereinafter referred to as "friction") acting on the steering system, including a steering wheel, of a vehicle is large, then disturbances from the road are suppressed, allowing the driver of the vehicle to turn the steering wheel stably and hence steer the vehicle with ease.

Therefore, to attain better steering stability and comfortableness while the vehicle is being driven, it is preferable for the friction applied to the steering wheel to be relatively large at the time the steering wheel is held still when the vehicle is traveling along a curve having a constant turning radius (in other words, when the steering wheel is held to keep the vehicle turning) or when the vehicle is traveling straight.

If it is assumed that the gain of a steering assisting force (referred to as "assisting gain") of a power steering system is indicated by GA, then at the time the steering assisting force is acting when the steering wheel is held to keep the vehicle turning, the steering stabilizing capability based on friction is canceled by the steering assisting force and reduced to $1/(1+GA)$.

In order for the power steering system to achieve a desired steering stabilizing capability in such a situation, therefore, more friction needs to be applied to the power steering system.

On the other hand, when the steering wheel is turned to steer the vehicle, it is preferable to reduce a friction loss, and when the steering wheel is turned back, the fiction acting on the steering wheel should preferably be relatively small.

According to the technologies disclosed in Japanese Laid-Open Patent Publication No. 54-110527, Japanese Laid-Open Patent Publication No. 60-174364, and Japanese Laid-Open Patent Publication No. 2000-313348, the magnitude of the friction acting on the steering wheel can be adjusted by varying the pressing force applied by the rack guide.

According to the technologies disclosed in Japanese Laid-Open Patent Publication No. 54-110527 and Japanese Laid-Open Patent Publication No. 60-174364, however, since the friction cannot be increased when the steering wheel is held to keep the vehicle turning, no steering stability can be attained when the steering wheel is held to keep the vehicle turning.

According to the technologies disclosed in Japanese Laid-Open Patent Publication No. 54-110527, Japanese Laid-Open Patent Publication No. 60-174364, and Japanese Laid-Open Patent Publication No. 2000-313348, as the friction is mechanically increased, the steering assisting mechanism has to generate an increased amount of work commensurate with the mechanically increased friction. Consequently, the problem of an increased friction loss cannot be solved.

One solution is to apply friction electrically rather than mechanically.

Japanese Patent No. 3840310 discloses an electric power steering apparatus that is designed based on the idea that in order to cancel friction acting in a direction which runs counter to the rotational direction of a motor, the motor may generate output power in the same direction as the rotational direction of the motor. According to the disclosed electric power steering apparatus, the rotational direction of the motor is detected by a motor angular velocity sensor, and the polarity of a friction compensating value is selected in order to enable the motor to generate output power in the same direction as the rotational direction of the motor.

SUMMARY OF INVENTION

The electric power steering apparatus disclosed in Japanese Patent No. 3840310 is not a technology for electrically applying friction, but a technology for electrically canceling friction.

Specifically, the technology disclosed in Japanese Patent No. 3840310 addresses two problems, i.e., a problem that when the steering wheel is turned, the driver feels friction as resistance, and a problem that when the steering wheel is turned back, its tendency to turn back to its neutral position is impaired because the self-aligning torque (SAT) thereof is canceled by friction. To solve these two problems, the disclosed electric power steering apparatus controls the motor with a friction current value for canceling friction.

The present invention is made in view of the above-mentioned background technologies and problems. It is an object of the present invention to provide an electric power steering apparatus which is capable of electrically generating appropriate mechanical friction against operation of a steering wheel.

Another object of the present invention is to provide an electric power steering apparatus for use on a vehicle, which is capable of electrically generating and applying appropriate mechanical friction against operation of a steering wheel for better steering stability, at the time the steering wheel is at least held still or is regarded as being held still when the vehicle is traveling along a curve having a constant turning radius (in other words, when the steering wheel is held to keep the vehicle turning) or when the vehicle is traveling straight.

According to the present invention, there is provided an electric power steering apparatus for determining a target current value with an assistance controller based on a steering torque value which is detected by a steering torque sensor depending on operation of a steering wheel, and controlling a motor based on the target current value, comprising a friction controller for determining a friction torque value based on the steering torque value in order to apply friction to the operation of the steering wheel, and a first friction generator for generating a corrected steering torque value by correcting the steering torque value with the friction torque value, the assistance controller determining a first corrected target current value, which is to replace the target current value, based on the corrected steering torque value (see, for example, FIGS. 4B and 5).

According to the present invention, the assistance controller which determines a target current value for the motor based on the steering torque value determines a first corrected target current value based on the corrected steering torque value that is generated by correcting the steering torque value with the friction torque value. Therefore, mechanical friction is electrically generated and applied to operation of the steering wheel.

The electric power steering apparatus further includes a friction torque value-to-current value converter for converting the friction torque value into a friction current value, and a target current corrector for generating a second corrected target current value by correcting the first corrected target current value with the friction current value (see FIGS. 2 and 4D). Consequently, the electric power steering apparatus is capable of electrically generating and applying appropriate friction to operation of the steering wheel at the time the steering wheel is at least held still or is regarded as being held still when the vehicle is traveling along a curve having a constant turning radius (in other words, when the steering wheel is held to keep the vehicle turning) or when the vehicle is traveling straight. Thus, the steering stability can be improved.

According to the present invention, there is also provided an electric power steering apparatus for determining a target current value with an assistance controller based on a steering torque value which is detected by a steering torque sensor depending on operation of a steering wheel, and controlling a motor based on the target current value, comprising a friction controller for determining a friction torque value based on the steering torque value in order to apply friction to the operation of the steering wheel, a friction torque value-to-current value converter for converting the friction torque value into a friction current value, and a target current corrector for generating a corrected target current value by correcting the target current value with the friction current value (see, for example, FIGS. 4C and 6).

According to the present invention, the assistance controller which determines the target current value for the electric motor based on the steering torque value controls the electric motor based on a corrected target current value produced by correcting the target current value with a friction current value (the friction current value converted from the friction torque value determined based on the steering torque value). Consequently, mechanical friction is electrically generated and applied to operation of the steering wheel. As a result, since mechanical friction is electrically generated and applied to operation of the steering wheel when the vehicle is traveling straight, better steering stability is attained.

In each of the above electric power steering apparatus, when the friction controller determines the friction torque value, the friction controller determines a value at which a rotational speed of the motor is of a zero value, as the friction torque value. Therefore, it is possible to easily determine a friction torque value electrically.

According to the present invention, when the vehicle is being driven, mechanical friction can be electrically generated and applied to operation of the steering wheel.

Since friction which has heretofore been mechanically generated can be electrically generated, any mechanism for making pressing forces of a rack guide variable is not required, and the electric power steering apparatus may have a steering mechanism which is simple in structure, low in weight, and low in cost.

DESCRIPTION OF EMBODIMENTS

Electric power steering apparatus according to embodiments of the present invention will be described below with reference to the accompanying drawings.

Figure 1:
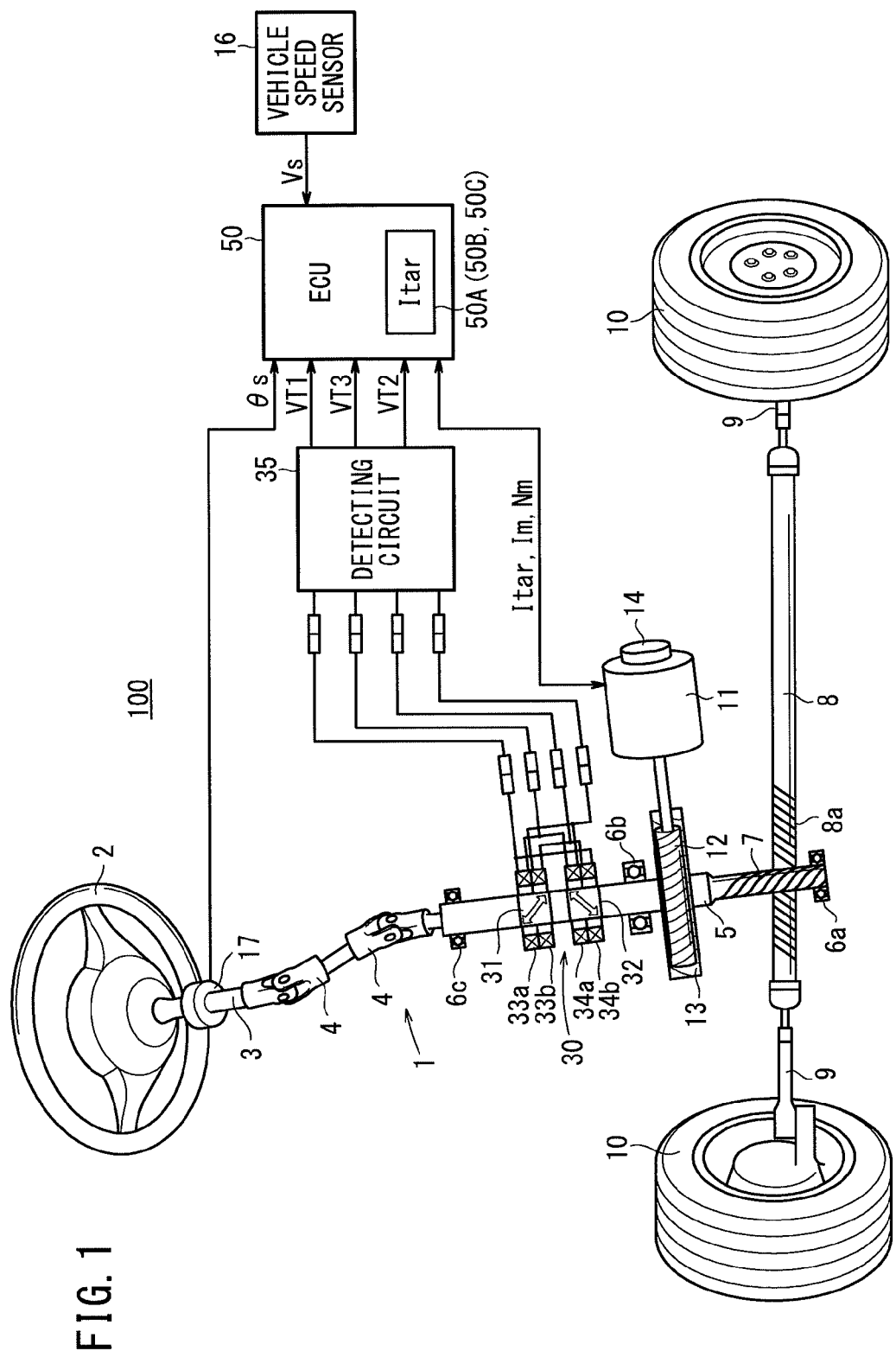
FIG. 1 is a schematic view of the configuration of an electric power steering apparatus according to an embodiment of the present invention.

FIG. 1 is a schematic view of the configuration of an electric power steering apparatus 100 according to an embodiment of the present invention.

As shown in FIG. 1, the electric power steering apparatus 100, which is incorporated in a vehicle such as an automobile, includes a steering shaft 1 connected to a steering wheel 2. The steering shaft 1 includes a main steering shaft 3 integrally joined to the steering wheel 2, a pinion shaft 5 having a pinion 7 of a rack and pinion mechanism, and a universal joint 4 which interconnects the main steering shaft 3 and the pinion shaft 5.

The pinion shaft 5 has lower, intermediate, and upper portions rotatably supported respectively by bearings 6a, 6b, 6c. The pinion 7 is disposed on a lower end portion of the pinion shaft 5. The rack and pinion mechanism also includes rack teeth 8a on a rack shaft 8 which extends and is axially back and forth along transverse directions of the vehicle. The pinion 7 is held in mesh with the rack shaft 8. The rack shaft 8 has opposite ends connected through respective tie rods 9 to left and right steerable front road wheels 10 of the vehicle.

When the driver of the vehicle turns the steering wheel 2, it causes the rack and pinion mechanism to steer the front road wheels 10 for thereby changing the direction of the vehicle. The rack shaft 8, the rack teeth 8a, and the tie rods 9 jointly make up a road wheel steering mechanism.

The electric power steering apparatus 100 also includes an electric motor 11 for supplying the pinion shaft 5 with a steering assisting force for reducing a steering force generated by the steering wheel 2. The electric motor 11 has an output shaft coaxially coupled to a worm gear 12 that is held in driving mesh with a worm wheel gear 13 mounted on the pinion shaft 5 below the bearing 6b on the intermediate portion of the pinion shaft 5.

The pinion shaft 5 supports thereon a known magnetostrictive steering torque sensor 30 for detecting a steering torque based on a change that is caused in magnetic characteristics by magnetostriction. The magnetostrictive steering torque sensor 30 is positioned between the bearing 6b on the intermediate portion of the pinion shaft 5 and the bearing 6c on the upper portion of the pinion shaft 5.

The magnetostrictive steering torque sensor 30 includes, as principal components, a first magnetostrictive film 31 and a second magnetostrictive film 32 which are disposed as annular films fully circumferentially on the outer circumferential surface of the pinion shaft 5, a first detecting coil 33a and a second detecting coil 33b which are disposed around the first magnetostrictive film 31 in facing relation thereto, a third detecting coil 34a and a fourth detecting coil 34b which are disposed around the second magnetostrictive film 32 in facing relation thereto, and a detecting circuit 35 electrically connected to the first, second, third, and fourth detecting coils 33a, 33b, 34a, 34b.

Each of the first magnetostrictive film 31 and the second magnetostrictive film 32 comprises a metal film made of a magnetic material whose magnetic permeability tends to change largely under strains applied thereto. For example, each of the first magnetostrictive film 31 and the second magnetostrictive film 32 comprises an alloy film of Ni—Fe plated on the outer circumferential surface of the pinion shaft 5.

The first magnetostrictive film 31 has a magnetic anisotropy inclined at an angle of about 45 degrees to the axis of the pinion shaft 5, and the second magnetostrictive film 32 has a magnetic anisotropy inclined at an angle of about 90 degrees to the direction of the magnetic anisotropy of the first magnetostrictive film 31. The respective magnetic anisotropies of the first and second magnetostrictive films 31, 32 are out of phase with each other by an angle of about 90 degrees.

The first detecting coil 33a and the second detecting coil 33b are disposed coaxially with each other around the first magnetostrictive film 31 with a given gap being present therebetween. The third detecting coil 34a and the fourth detecting coil 34b are disposed coaxially with each other around the second magnetostrictive film 32 with a given gap being present therebetween.

With the respective magnetic anisotropies of the first and second magnetostrictive films 31, 32 being set as described above, when a torque (steering torque) is applied to the pinion shaft 5, a compressive force is applied to one of the first and second magnetostrictive films 31, 32, and a tensile force is applied to the other of the first and second magnetostrictive films 31, 32. As a result, the magnetic permeability of the one of the first and second magnetostrictive films 31, 32 is increased, and the magnetic permeability of the other of the first and second magnetostrictive films 31, 32 is reduced. Accordingly, the inductance of the detecting coil disposed around the one of the first and second magnetostrictive films 31, 32 is increased, and the inductance of the detecting coil disposed around the other of the first and second magnetostrictive films 31, 32 is reduced.

The detecting circuit 35 converts the changes in the inductances of the detecting coils into failure detecting signals VT1, VT2 and a torque signal (hereinafter referred to as "steering torque value") VT3, and outputs them to an ECU (Electronic Control Unit) 50.

A target current calculator 50A, which is one of the functions of ECU 50, calculates a target current value Itar based on output signals from the detecting circuit 35 which outputs the steering torque value VT3, a rotational speed sensor 14 which detects the rotational speed Nm of the motor 11, a vehicle speed sensor 16 which detects the traveling speed Vs of the vehicle (vehicle speed), and a steering angle sensor 17 which detects a steering angle θs of the steering wheel 2, and controls the electric motor 11 to bring the calculated target current value Itar into conformity with a current Im that flows through the electric motor 11 for generating a steering assisting force thereby to reduce the steering force produced by the steering wheel 2.

The ECU 50 includes a microcomputer having a CPU, a ROM, a RAM, input/output interfaces such as an A/D converter and a D/A converter, a timer, etc. When the CPU of the microcomputer executes programs stored in the ROM based on various input signals, the ECU 50 operates as various functional components to control the electric motor 11, etc.

A process of calculating the target current value Itar in controlling the electric motor 11, which is carried out by the target current calculator 50A of the ECU 50, will be described below with reference to FIGS. 2 and 3.

Figure 2:
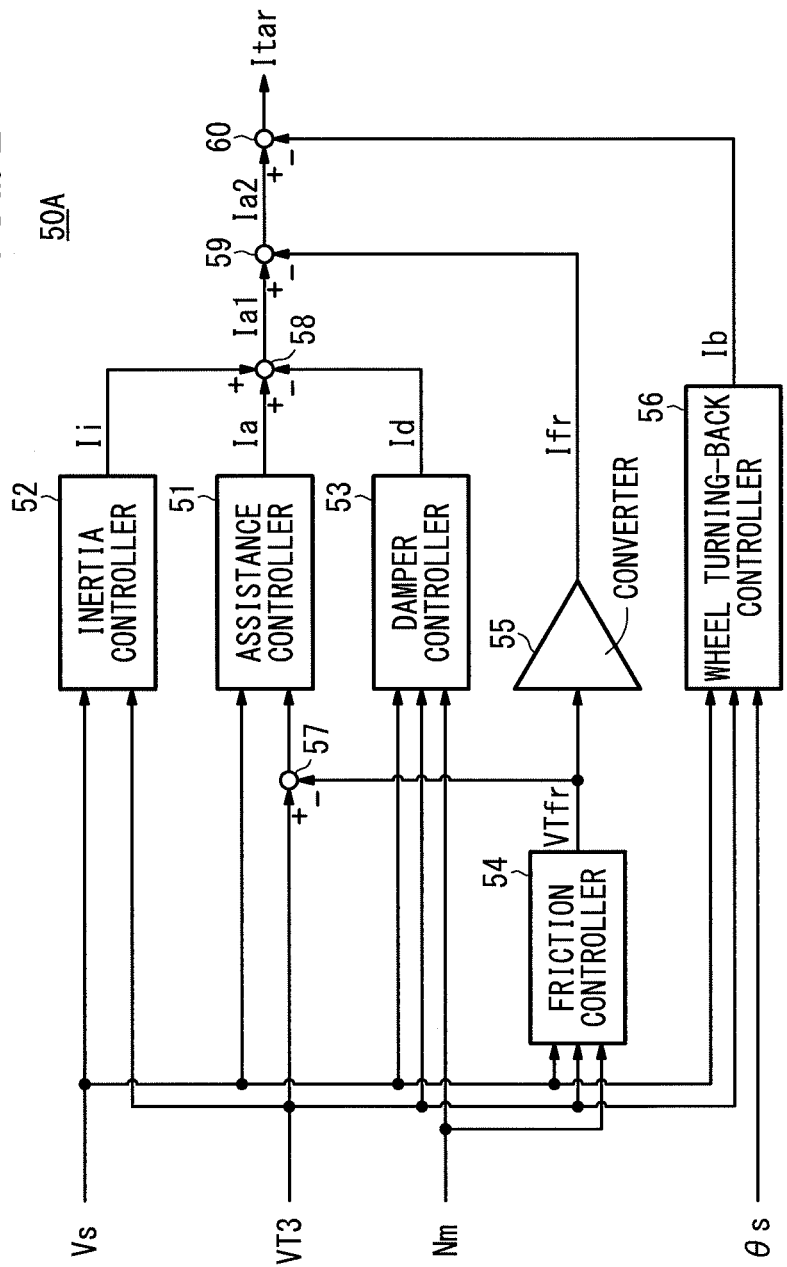
FIG. 2 is a functional block diagram of a target current calculator of the electric power steering apparatus.

FIG. 2 is a functional block diagram (target current calculating block diagram) of the target current calculator 50A of the ECU 50 for calculating the target current value Itar that is supplied to the electric motor 11 to generate a steering assisting force. FIG. 3 is a block diagram showing details of a friction controller 54 in the current calculating block diagram shown in FIG. 2.

As shown in FIG. 2, the target current calculator 50A includes, as basic controllers, an assistance controller 51 for calculating an assisting current value Ia (basic assisting current value) based on the steering torque value VT3 and the vehicle speed Vs, in order to reduce a steering force Fs applied from the driver to the steering wheel 2, an inertia controller 52 for calculating an inertia current value Ii based on a torque differential value produced by differentiating the steering torque value VT3, the vehicle speed Vs, and the steering torque value VT3, in order to compensate for the inertia of the electric motor 11, and a damper controller 53 for calculating a damper current value Id based on the rotational speed Nm of the electric motor 11, the steering torque value VT3, and the vehicle speed Vs, in order to increase the converging capability of the vehicle.

The assistance controller 51 generally has such characteristics that it lowers the gain as the vehicle speed Vs become higher and increases the gain as the steering torque value VT3 becomes larger. As a consequence, the assisting current value Ia generally increases as the steering torque value VT3 increases, and decreases as the vehicle speed Vs increases.

The inertia controller 52 has characteristics for compensating for a reduction in the response due to the inertia of the rotor of the electric motor 11, and mainly calculates an inertia current value Ii depending on the torque differential value of the steering torque value VT3 or the like. The inertia current value Ii is added to the assisting current value Ia by a current value computing unit 58 (current value adder/subtractor, current value adding/subtracting section).

The damper controller 53 includes a table for suppressing the rotational speed of the electric motor 11, and mainly calculates a damper current value Id that becomes larger as the motor rotational speed Nm becomes higher. The damper current value Id is subtracted from the assisting current value Ia by the current value computing unit 58. This steering damper effect increases the converging capability of the steering wheel 2.

The target current calculator 50A also includes a wheel turning-back controller 56 for calculating a wheel turning-back current value Ib based on the steering angle θs, the steering torque value VT3, and the vehicle speed Vs, in order to increase the capability of the steering wheel 2 to turn back.

The wheel turning-back controller 56 has such characteristics for causing the steering wheel 2 to turn back naturally under the SAT when the driver turns back the steering wheel 2, and calculates a wheel turning-back current value Ib. The wheel turning-back current value Ib is subtracted from an assisting current value Ia2 by a current value subtractor 60 (current value subtracting section).

Figure 3:
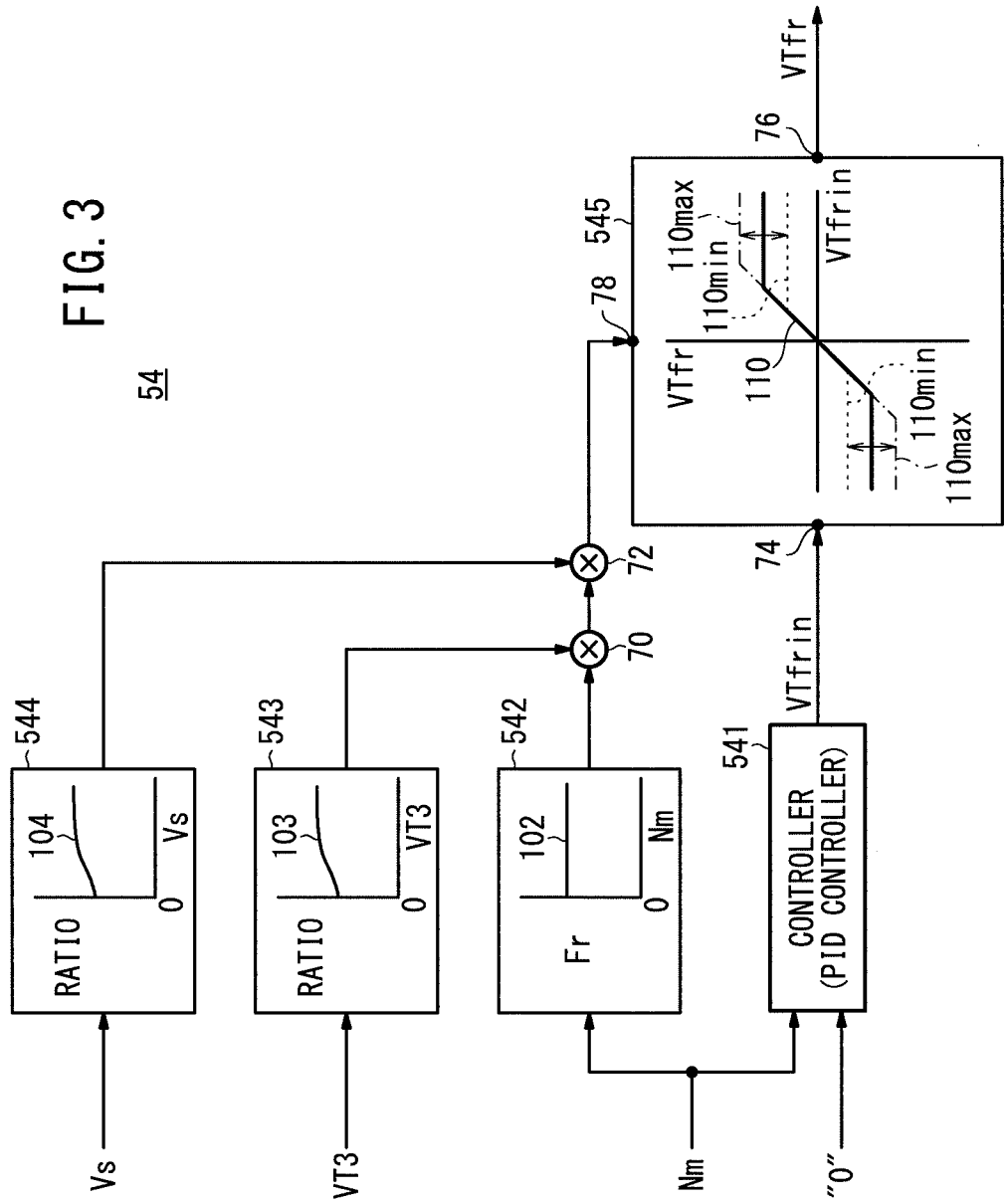
FIG. 3 is a functional block diagram of a friction controller in the target current calculator.

As shown in FIG. 3, the friction controller 54 includes a controller 541 (pseudo-friction torque value calculator) for electrically calculating a pseudo-friction torque value VTfrin by performing a control process (PID control process) to bring the motor rotational speed Nm into conformity with a target value "0", a friction determiner 542 having a characteristic curve 102 (which may be varied, but which calculates a constant value of applied friction independent of the motor rotational speed Nm in the illustrated embodiment) for determining friction to be applied based on the motor rotational speed Nm, a torque ratio section 543 for outputting a ratio (values 0 through 1: a characteristic for making the value of the ratio closer to a value of 1 as the steering torque value VT3 is greater) according to a characteristic curve 103 depending on the steering torque value VT3, to change the friction to be applied with a multiplier 70, a vehicle speed ratio section 544 for outputting a ratio (values 0 through 1: a characteristic for making the value of the ratio closer to a value of 1 as the vehicle speed Vs is higher) according to a characteristic curve 104 depending on the vehicle speed Vs, to change the friction to be applied with a multiplier 72, and a friction torque value changer (friction torque value adjuster) 545 for correcting the friction torque value VTfrin according to a characteristic curve 110 based on an applied friction control value determined by the friction determiner 542, the torque ratio section 543, and the vehicle speed ratio section 544, thereby to calculate a friction torque value VTfr.

The friction torque value changer 545 outputs the friction torque value VTfrin supplied to an input port 74 thereof in such a manner that if the friction torque value VTfrin has a small value, the friction torque value changer 545 outputs the friction torque value VTfrin as a proportional value depending on the gradient of the characteristic curve 110, and if the friction torque value VTfrin has a large value, the friction torque value changer 545 limits it to a predetermined value and outputs the limited friction torque value VTfrin. For example, when the vehicle speed Vs is high, the friction torque value changer 545 limits the friction torque value VTfrin to a characteristic curve level 110 max, and when the vehicle speed Vs is low, the friction torque value changer 545 limits the friction torque value VTfrin to a characteristic curve level 110 min. When the friction torque value changer 545 outputs the friction torque value VTfrin as a proportional value depending on the gradient of the characteristic curve 110, the friction torque value changer 545 may change the gradient of the characteristic curve 110 or may use a curved gradient, rather than a straight gradient, as the gradient of the characteristic curve 110, depending on the vehicle speed Vs, the steering torque value VT3, and the motor rotational speed Nm.

The friction torque value VTfr that is calculated by the friction controller 54 and output from the friction torque value changer 545 is supplied to a subtractive port of a torque value subtractor 57 (torque value subtracting section), and is also converted by a friction torque value-to-current value converter 55 into a friction current value Ifr, which is supplied to a subtractive port of a current value subtractor 59 (current value subtracting section).

The friction current value Ifr produced by the friction torque value-to-current value converter 55 is subtracted from the assisting current value Ia1 that has been calculated from the assisting current value Ia, the inertia current value Ii, and the damper current value Id by the current value computing unit 58, so that the current value subtractor 59 calculates an assisting current value Ia2 for generating a superposed torque applied counter to the steering action made on the steering wheel 2 by the driver. The current value subtractor 60 generates a current value by subtracting the wheel turning-back current value Ib from the assisting current value Ia2, and supplies the generated current as the target current value Itar to the electric motor 11. In this manner, mechanical friction is electrically applied to the steering system when the steering wheel 2 is turned.

The friction that is applied to the steering system including the steering wheel 2 by the friction current value Ifr is effectively applied at the time no steering assisting force is generated as when the vehicle is traveling straight. However, at the time a steering assisting force is generated as when the steering wheel 2 is held to keep the vehicle turning, the friction is reduced to 1/(1+GA) by the assisting gain GA of the assistance controller 51.

In order to make up for the reduction in the friction, the friction torque value VTfr calculated by the friction controller 54 is subtracted from the steering torque value VT3 by the torque value subtractor 57. As a result, the assisting current value Ia calculated by the assistance controller 51 is changed of necessity by the product of the friction torque value VTfr and the assisting gain GA. The assisting current value Ia, combined with the friction current value Ifr, makes it possible to electrically apply uniform mechanical friction independent of the assisting gain GA of the assistance controller 51.

In this manner, friction is applied to the steering system in the full range of steering action for allowing the driver to have a good steering feel.

Figure 4:
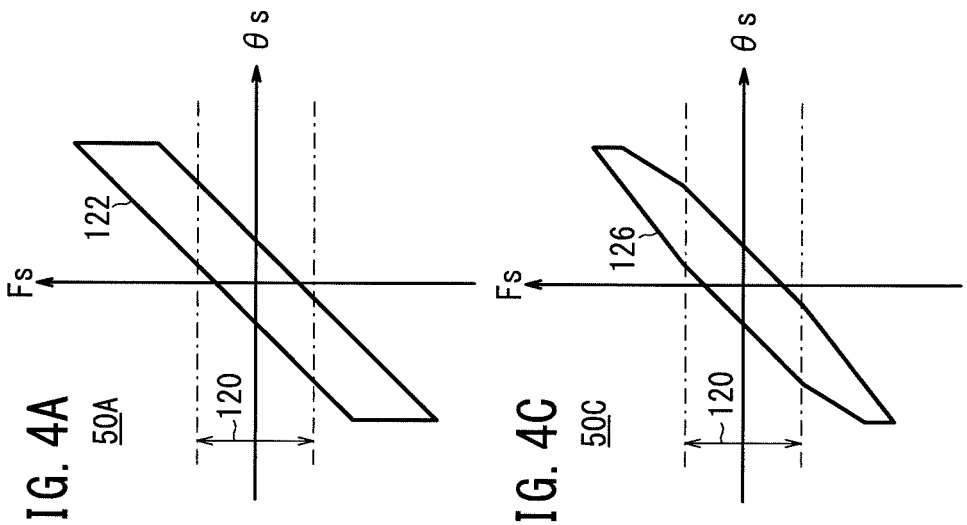
FIG. 4A is a diagram showing a steering angle vs. steering force characteristic curve in a best mode at the time a friction torque value and a friction current value are applied.
FIG. 4B is a diagram showing a steering angle vs. steering force characteristic curve at the time a friction torque value is applied.
FIG. 4C is a diagram showing a steering angle vs. steering force characteristic curve at the time a friction current value is applied.
FIG. 4D is a diagram showing a steering angle vs. steering force characteristic curve according to a comparative example.

FIG. 4D shows a steering angle vs. steering force characteristic curve 128 according to a comparative example. FIG. 4A shows a steering angle vs. steering force characteristic curve 122 obtained when the target current calculator 50A is used in the mode (best mode) shown in FIG. 2. According to the steering angle vs. steering force characteristic curve 122 in the best mode, when the steering wheel 2 is turned, the steering force Fs (the steering force applied by the driver) that increases in proportion to the steering angle θs is a highly linear steering force Fs. Immediately after the steering wheel 2 starts to turn back, firm hysteresis is applied because the steering assisting force is reduced by the friction torque value VTfr. When the steering wheel 2 is turned back, the steering force Fs is a highly linear steering force that decreases in proportion to the steering angle θs. Therefore, appropriate friction (friction that makes the steering angle vs. steering force characteristic curve linear according to a linear function) is applied to the steering system in all range of steering angles θs.

The electric power steering apparatus 100 which incorporates the target current calculator 50A shown in FIG. 2 is effective to prevent friction from being reduced because it subtracts the friction torque value VTfr from the steering torque value VT3 in order to compensate for a reduction in the friction applied by the friction current value Ifr due to the assisting gain GA of the assistance controller 51 when the steering wheel 2 is held to keep the vehicle turning or the like.

Figure 5:
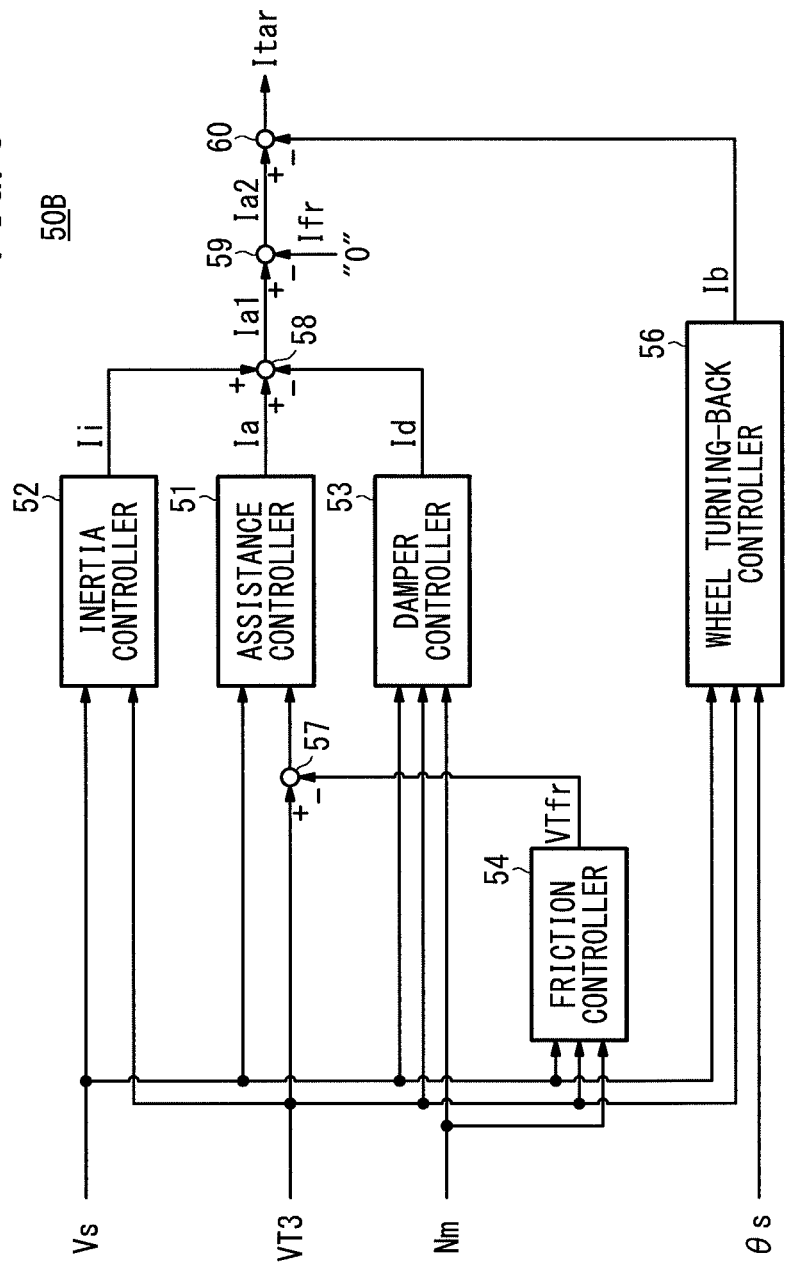
FIG. 5 is a functional block diagram of another example of the target current calculator of the electric power steering apparatus.

FIG. 4B shows a steering angle vs. steering force characteristic curve 124 of an electric power steering apparatus which incorporates a target current calculator 50B according to another embodiment shown in FIG. 5. The target current calculator 50B is free of the friction torque value-to-current value converter 55 and hence produces no friction current value Ifr. Though the steering angle vs. steering force characteristic curve 124 is unable to apply appropriate friction to the steering system in the vicinity of the neutral position of the steering angle θs, the steering angle vs. steering force characteristic curve 124 has a certain advantage over the steering angle vs. steering force characteristic curve 128 according to the comparative example shown in FIG. 4D as it can apply appropriate friction to the steering system based on the friction torque value VTfr when the steering wheel 2 is held to keep the vehicle turning or the like. The current value subtractor 59 may be dispensed with (Ia2=Ia1).

Figure 6:
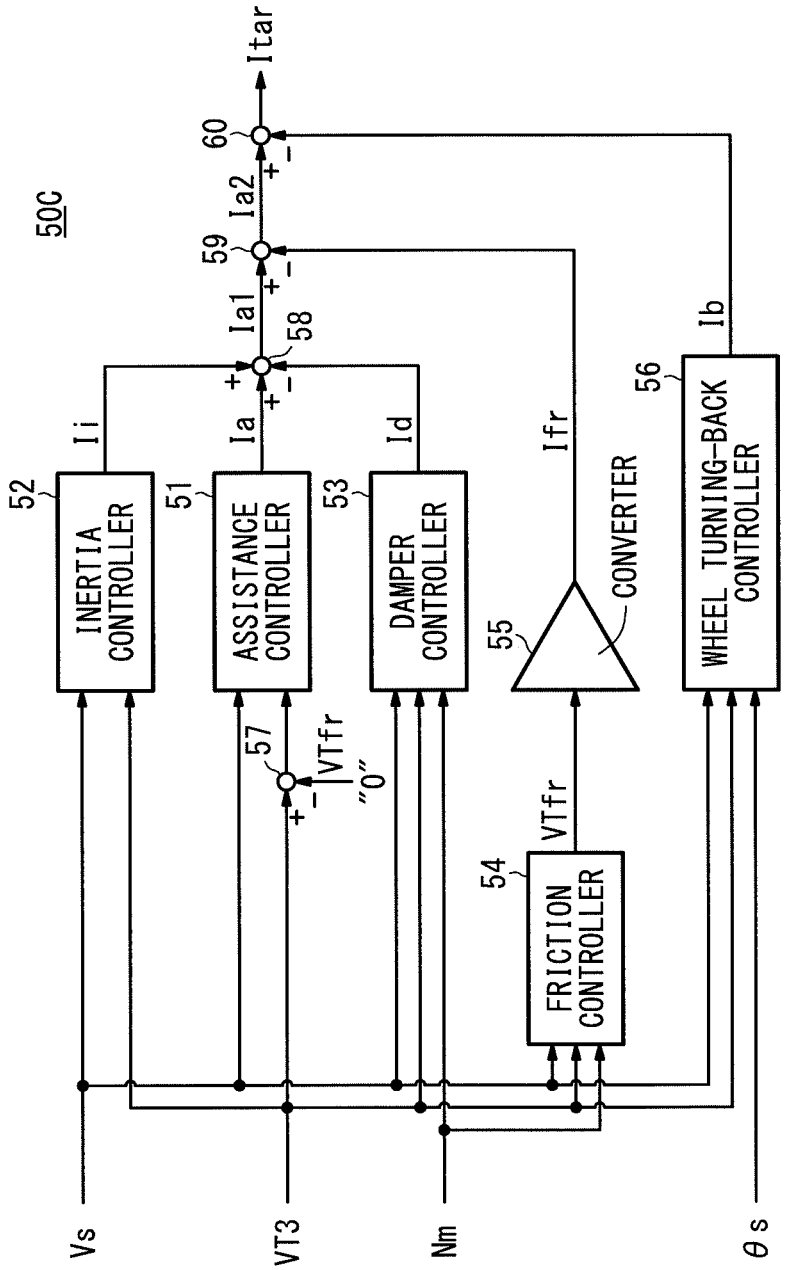
FIG. 6 is a functional block diagram of still another example of the target current calculator of the electric power steering apparatus.

FIG. 4C shows a steering angle vs. steering force characteristic curve 126 of an electric power steering apparatus which incorporates a target current calculator 50C according to still another embodiment shown in FIG. 6. The target current calculator 50C does not subtract the friction torque value VTfr from the steering torque value VT3 (the torque value subtractor 57 may be dispensed with). Though the steering angle vs. steering force characteristic curve 126 is unable to apply appropriate friction to the steering system when the steering wheel 2 is held to keep the vehicle turning or the like, the steering angle vs. steering force characteristic curve 126 has a certain advantage over the steering angle vs. steering force characteristic curve 128 according to the comparative example shown in FIG. 4D as it can apply appropriate friction to the steering system based on the friction current value Ifr in the vicinity of the neutral position of the steering angle θs. The torque value subtractor 57 may be dispensed with.

In the steering angle vs. steering force characteristic curves 122, 124, 126, 128 shown in FIGS. 4A through 4D, a predetermined range 120 of the steering force Fr represents a range wherein the steering force Fr changes linearly in response to the steering angle θs. In the predetermined range 120, therefore, the steering assisting force is applied in proportion to the steering angle θs.

According to the embodiment (FIGS. 5 and 4B) having the target current calculator 50B shown in FIG. 5 described above, the electric power steering apparatus 100 which determines a target current value Itar based on a steering assisting current value Ia that is basically calculated by the assistance controller 51 based on a steering torque value VT3 which is detected by the steering torque sensor 30 depending on the operation of the steering wheel 2, and controls the electric motor 11 based on the target current value Itar, includes the friction controller 54 for determining a friction torque value VTfr based on the steering torque value VT3 in order to apply friction to the operation of the steering wheel 2, and the torque value subtractor 57 (first friction generator) for generating a corrected steering torque value (VT3−VTfr) by correcting the steering torque value VT3 with the friction torque value VTfr. The assistance controller 51 determines a first corrected target current value Ia1 based on the corrected steering torque value (VT3−VTfr) that is generated by correcting the steering torque value VT3 with the friction torque value VTfr. Therefore, mechanical friction is electrically generated and applied to the operation of the steering wheel 2.

According to the embodiment (FIGS. 2 and 4A) having the target current calculator 50A shown in FIG. 2, the target current calculator 50A includes the friction torque value-to-current value converter 55 for converting the friction torque value VTfr into a friction current value Ifr, and the current value subtractor 59 for generating a second corrected target current value Ia2 by correcting the first corrected target current value Ia1 with the friction current value Ifr. Consequently, the electric power steering apparatus 100 is capable of electrically generating and applying appropriate friction against operation of the steering wheel 2 at the time the steering wheel 2 is at least held still or is regarded as being held still when the vehicle is traveling along a curve having a constant turning radius (in other words, when the steering wheel is held to keep the vehicle turning) or when the vehicle is traveling straight. Then, better steering stability is attained.

According to the embodiment (FIGS. 6 and 4C) having the target current calculator 50C shown in FIG. 6, the assistance controller 51 for determining the target current value Itar for the electric motor 11 based on the steering torque value VT controls the electric motor 11 based on a corrected target current value Ia2 produced by correcting the target current value Itar with a friction current value (the friction current value Ifr converted from the friction torque value VTfr determined based on the steering torque value VT3). Consequently, friction is electrically generated and applied to the operation of the steering wheel 2. As a result, since friction is electrically generated and applied to the operation of the steering wheel 2 when the vehicle is traveling straight, better steering stability is attained.

In each of the above embodiments, when the friction controller 54 determines a friction torque value VTfr, it determines a value at which the rotational speed Nm of the electric motor 11 is of a zero value, as the friction torque value VTfr. Therefore, the friction controller 54 can easily determine a friction torque value VTfr electrically.

The present invention is not limited to the above embodiments and advantages, but can have various arrangements and advantages, as described below, based on the disclosure of the present description.

According to a first aspect, inasmuch as mechanical friction is electrically applied to reduce steering forces by controlling the electric motor 11 based on at least the steering torque value VT3 that is detected by the steering torque sensor 30, the amount of work performed by the electric motor 11 is reduced when the steering wheel 2 is turned, and increased when the steering wheel 2 is turned back. As a consequence, when the steering wheel 2 is turned and turned back, no energy loss is increased, and stability and comfortableness are increased when the vehicle is traveling straight and when the steering wheel 2 is held to keep the vehicle turning.

According to a second aspect, electrically applied friction is made variable depending on the vehicle speed Vs thereby to achieve both increased stability at the time the vehicle travels at high speeds and the smoothness with which the steering wheel 2 is turned back at the time the vehicle travels at low speeds.

According to a third aspect, electrically applied friction is varied depending on the steering torque value VT3, thereby making it possible to set the feel of friction, which the driver will have, as desired depending on the steering torque value VT3.

According to a fourth aspect, electrically applied friction is varied depending on the state indicative of when the steering wheel 2 is turned or turned back thereby to achieve both resistance which the driver feels from the steering wheel 2 when the steering wheel 2 is turned and smoothness which the driver feels from the steering wheel 2 when the steering wheel 2 is turned back.

According to a fifth aspect, two or all of the second through fourth aspects described above may be combined together. The second through fourth aspects combined together make it possible to keep a good steering feel regardless of how the vehicle is steered or traveling.

According to a sixth aspect, since the steering speed of the steering wheel 2 is detected from the moving speed of the rack or the motor rotational speed Nm, and the friction current value Ifr serving as a motor drive signal (target current) is used as a control output signal to control the steering speed to have a zero value, friction which is similar to increased mechanical friction can be applied.

According to a seventh aspect, as the friction torque value VTfr is used as a control output signal to control the steering speed of the steering wheel 2 to have a zero value, a good friction feel is obtained when the steering wheel 2 is assisted.

The sixth and seventh aspects may be combined together to achieve a good steering feel which makes the friction feel, which the driver will have, unchanged by the assisting gain GA.

According to an eighth aspect, a limiter is provided for the control output signal from the controller 541 as a steering speed control means to set electrically applied friction as desired.

According to a ninth aspect, the limit values of the limiter are made variable by any one or a combination of the vehicle speed VS, the steering torque value VT3, the steering speed, and the state indicative of when the steering wheel 2 is turned or turned back, thereby to apply appropriate friction depending on how the vehicle is traveling or steered.

According to a tenth aspect, the wheel turning-back controller 56 is provided for allowing the steering wheel 2 to turn back smoothly based on any one or a combination of the steering angle θs, the yaw rate, the lateral G, and SAT thereby to apply friction without causing the steering wheel 2 to turn back less smoothly.

The invention claimed is:

1. An electric power steering apparatus for determining a target current value with an assistance controller based on a steering torque value which is detected by a steering torque sensor depending on operation of a steering wheel, and controlling a motor based on the target current value, the electric power steering apparatus comprising:
hardware processor circuitry, comprising:
a friction controller determining a friction torque value based on the steering torque value in order to apply friction to the operation of the steering wheel;
a first friction generator generating a corrected steering torque value by correcting the steering torque value with the friction torque value;
the assistance controller determining a first corrected target current value, which is to replace the target current value, based on the corrected steering torque value;
a friction torque value-to-current value converter converting the friction torque value into a friction current value; and
a target current corrector generating a second corrected target current value by correcting the first corrected target current value with the friction current value.

2. The electric power steering apparatus according to claim 1, wherein when the friction controller determines the friction torque value, the friction controller determines a value at which the rotational speed of the motor is of a zero value, as the friction torque value.

3. An electric power steering apparatus for determining a basic assisting current value with an assistance controller based on a steering torque value which is detected by a steering torque sensor depending on operation of a steering wheel, determining an inertia current value with an inertia controller based on a differential value of the steering torque value, determining a damper current value with a damper controller based on a rotational speed of a motor, and controlling the motor based on an assisting current value that is calculated from the basic assisting current value, the inertia current value, and the damper current value, the electric power steering apparatus comprising:
hardware processor circuitry, comprising:
a friction controller determining a friction torque value; and
a first friction generator generating a corrected steering torque value by correcting the steering torque value with the friction torque value;
wherein among the assistance controller, the inertia controller, and the damper controller, only the assistance controller determines the basic assisting current value based on the corrected steering torque value.

* * * * *